US010867005B1

(12) United States Patent
Villiers et al.

(10) Patent No.: US 10,867,005 B1
(45) Date of Patent: Dec. 15, 2020

(54) DYNAMIC CONTENT CACHING AND RENDERING SYSTEM

(71) Applicant: Amazon Technologies, Inc., Seattle, WA (US)

(72) Inventors: Eric Villiers, Seattle, WA (US); Alex Jennifer Tribble, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 56 days.

(21) Appl. No.: 16/214,942

(22) Filed: Dec. 10, 2018

(51) Int. Cl.
| | |
|---|---|
| *G06F 16/957* | (2019.01) |
| *H04L 29/08* | (2006.01) |
| *H04L 12/911* | (2013.01) |
| *H04L 29/06* | (2006.01) |
| *H04L 12/26* | (2006.01) |
| *G06F 40/106* | (2020.01) |
| *G06F 40/103* | (2020.01) |

(52) U.S. Cl.
CPC .......... *G06F 16/9574* (2019.01); *H04L 43/08* (2013.01); *H04L 47/70* (2013.01); *H04L 65/4084* (2013.01); *H04L 67/02* (2013.01); *H04L 67/2842* (2013.01); *H04L 67/322* (2013.01); *H04L 67/327* (2013.01); *G06F 40/103* (2020.01); *G06F 40/106* (2020.01)

(58) Field of Classification Search
CPC ... H04L 67/02; H04L 67/2842; G06F 40/103; G06F 40/106
See application file for complete search history.

(56) References Cited

U.S. PATENT DOCUMENTS

| | | | | |
|---|---|---|---|---|
| 6,397,217 B1* | 5/2002 | Melbin | ................... | H04L 29/06 |
| 6,507,833 B1* | 1/2003 | Hichwa | .................... | G06F 9/465 |
| | | | | 707/702 |
| 6,516,338 B1* | 2/2003 | Landsman | ......... | G06Q 30/0241 |
| | | | | 709/203 |
| 6,622,168 B1* | 9/2003 | Datta | ...................... | H04L 29/06 |
| | | | | 709/219 |
| 6,654,814 B1* | 11/2003 | Britton | ................ | G06F 16/9577 |
| | | | | 709/246 |
| 7,343,412 B1* | 3/2008 | Zimowski | ............... | H04L 67/02 |
| | | | | 709/226 |
| 7,386,786 B2* | 6/2008 | Davis | .................... | G06F 16/958 |
| | | | | 715/234 |
| 7,409,710 B1* | 8/2008 | Uchil | ...................... | H04L 63/08 |
| | | | | 713/155 |
| 7,613,696 B2* | 11/2009 | Morgan | .............. | G06F 16/9535 |

(Continued)

*Primary Examiner* — Lashonda T Jacobs

(74) *Attorney, Agent, or Firm* — Knobbe, Martens, Olson & Bear, LLP

(57) ABSTRACT

A content provider system manages the caching of content that includes dynamically-rendered portions. The system can monitor performance metrics (e.g., latency, cache hit ratio, server load, etc.) regarding content and individual portions thereof. Based on the metrics, the system can automatically adjust a content rendering configuration that specifies which portions of the content are to be cached, which portions are to be dynamically rendered by a client device, and the like. In some embodiments, the system can automatically implement tests for various content rendering configurations, analyze the outcomes, and adjust content rendering configurations to improvement performance.

20 Claims, 8 Drawing Sheets

(56) References Cited

U.S. PATENT DOCUMENTS

| | | | | |
|---|---|---|---|---|
| 7,624,047 B1* | 11/2009 | Round | G06F 9/50 | 705/26.1 |
| 8,914,514 B1* | 12/2014 | Jenkins | H04L 67/10 | 709/226 |
| 9,311,425 B2* | 4/2016 | Mahan | G06F 15/16 | |
| 9,400,851 B2* | 7/2016 | Shatz | G06F 16/9574 | |
| 9,443,441 B1* | 9/2016 | Scott | G06F 3/0481 | |
| 9,626,343 B2* | 4/2017 | Zhang | G06F 16/986 | |
| 9,747,382 B1* | 8/2017 | Warman | G06F 16/907 | |
| 9,769,030 B1* | 9/2017 | Ramalingam | H04L 41/22 | |
| 10,706,119 B1* | 7/2020 | Yellin | G06F 16/9574 | |
| 10,762,282 B2* | 9/2020 | Karppanen | G06F 40/103 | |
| 2002/0004813 A1* | 1/2002 | Agrawal | G06F 16/9574 | 709/201 |
| 2002/0147788 A1* | 10/2002 | Nguyen | G06F 16/9574 | 709/217 |
| 2003/0025728 A1* | 2/2003 | Ebbo | G06F 8/30 | 715/744 |
| 2003/0046365 A1* | 3/2003 | Pfister | G06F 16/9574 | 709/219 |
| 2004/0123236 A1* | 6/2004 | Cheung | H04M 3/4938 | 715/234 |
| 2007/0129146 A1* | 6/2007 | Tzruya | G06Q 30/0271 | 463/42 |
| 2007/0210937 A1* | 9/2007 | Smith | G08G 1/0962 | 340/995.1 |
| 2008/0228772 A1* | 9/2008 | Plamondon | G06F 16/9574 | |
| 2008/0282176 A1* | 11/2008 | Bates | G06F 40/103 | 715/760 |
| 2010/0332589 A1* | 12/2010 | Schwimer | G06F 16/9574 | 709/203 |
| 2011/0029641 A1* | 2/2011 | Fainberg | H04L 67/2847 | 709/219 |
| 2012/0303697 A1* | 11/2012 | Alstad | G06F 16/9574 | 709/203 |
| 2014/0033019 A1* | 1/2014 | Zhang | G06F 40/14 | 715/234 |
| 2014/0118403 A1* | 5/2014 | Verthein | H04N 21/41415 | 345/660 |
| 2018/0034721 A1* | 2/2018 | Dunn | H04L 67/2857 | |
| 2018/0253373 A1* | 9/2018 | Mathur | G06F 11/34 | |

* cited by examiner

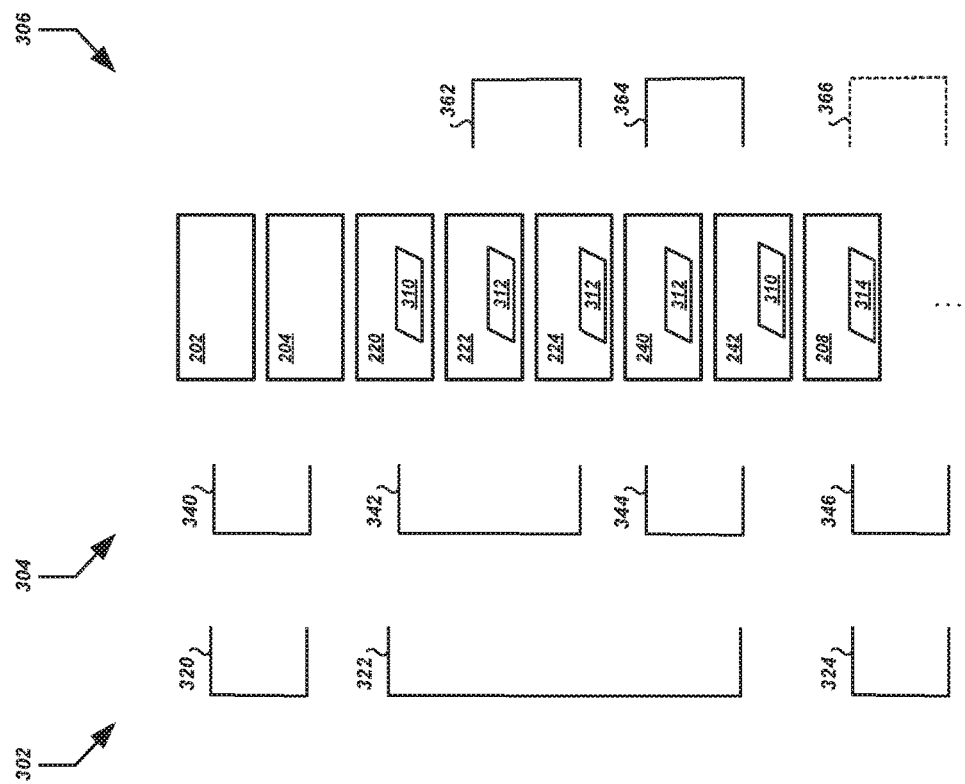

DYNAMIC CONTENT CACHING AND RENDERING SYSTEM

BACKGROUND

Computing devices may be used to host content and otherwise provide services in a network environment. For example, a client device may request a network resource (e.g., a web page) from a content provider, and the content provider may deliver the network resource via the internet. The client device may process the network resource, retrieve any items referenced by the network resource (e.g., images, scripts, and other embedded resources), and process the content for display. In some instances, the network resource and/or embedded resources may be requested multiple times by multiple different computing devices. Content providers can utilize the services of a caching system, such as a content delivery network (CDN) service provider, to store the commonly-requested resources in shared caches at various locations.

When a resource is cached at a shared cache, subsequent requests for the resource can be responded to with the cached resource, thereby avoiding a potentially inefficient request to the content provider for the resource. A CDN service provider may store a commonly-requested resource in a shared cache for a limited time before obtaining a new copy or version of the resource from the content provider. In some cases, the CDN service provider may request information regarding whether a resource has changed in the time since it was cached in order to determine whether to obtain a new copy or version of the resource.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

FIG. 3 is a block diagram of illustrative content rendering configurations according to some embodiments.

DETAILED DESCRIPTION

Figure 1:
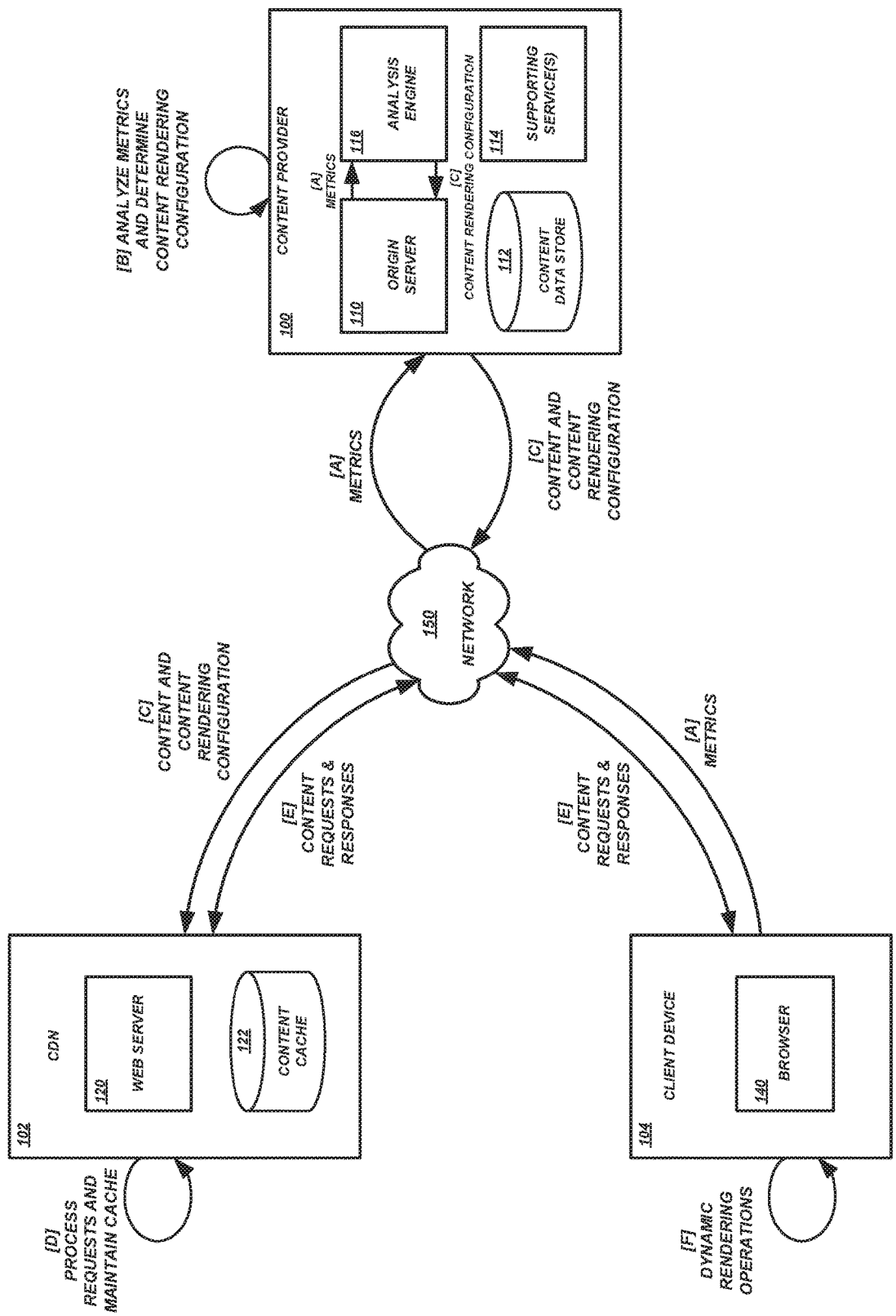
FIG. 1 is a block diagram of illustrative data flows and interactions between components of an illustrative network computing environment in connection with rendering content using dynamically-determined content rendering configurations according to some embodiments.

The present disclosure is directed to systems and methods for managing the caching of content that includes dynamically-rendered portions. A system can monitor performance metrics (e.g., latency, cache hit ratio, server load, etc.) regarding content and individual portions thereof. Based on the metrics, the system can automatically adjust a content rendering configuration that specifies which portions of the content are to be cached, which portions are to be dynamically rendered by a client device, and the like. In this way, a given content item may be defined once, but the content rendering configuration may be automatically changed to improve selected performance metrics by changing which portions are to be cached, which portions are to be dynamically rendered, how the portions are to be grouped, etc. Moreover, the performance metrics that are to be improved may be dynamically selected without requiring re-development of the underlying content item.

Generally described, a content provider may provide content (e.g., a network resource, such as a web page) that includes multiple portions (e.g., individual components, such as web page elements or embedded resources). Some portions may tend to remain stable over certain periods of time, while other portions may tend to change more often, such as portions that are to be dynamically rendered at request time. For example, a network resource may have portions that are to be provided to most or all users, and portions that are to be dynamically generated based on the value of various parameters at the time the content is requested (e.g., identity of the requesting user, characteristics of the requesting client device, server-side environmental variables, etc.). In some instances, the parameter values may exhibit a high degree of variability over the course of time, or even from request to request.

Portions of content that are to be provided to most or all users may be considered highly cacheable (e.g., requested often enough, and by enough different users, that the overall performance will benefit from caching). Illustratively, these portions may be hosted by, and provided by, a CDN service provider. For the portions that are to be dynamically generated after the request, a top-level resource that is cached and provided by the CDN service provider (e.g., the Hypertext Markup Language or "HTML" file that describes a requested web page) can reference the dynamic portions or include instructions to dynamically render the portions. Illustratively, a client device may make follow-up requests for the dynamically-generated content after receiving the cached top-level resource.

In some cases, a developer may determine the optimal or otherwise satisfactory balance of cached components and dynamically-rendered components to achieve a particular performance outcome. However, events may occur that affect the performance, and may require a change to the balance of cached components and dynamically-rendered components. At large scales (e.g., web sites with millions of users, millions of individual content items, millions of requests per unit of time, or a combination thereof), there are a corresponding large number of interrelated variables that can impact performance if not considered fully. For example, performance may be affected by: variability of cache key attributes, breaking down those cache keys into separate requests, latency impact, cache hit ratio, server load, time of day, client device, client connection, and page changes. Each possible combination of these variables, and each proposed balance of cached components to dynamically rendered components offered to address the variables, may require significant page structure analysis, client-side latency analysis, functional testing, and/or A/B testing. If any of these processes fail, the result could range from a regression in latency to an overall outage.

Some aspects of the present disclosure relate to automatically analyzing the variables that affect content delivery performance. Based on the analysis, the system can automatically implement changes to content rendering configurations (also referred to as "treatments") to optimize or otherwise improve the performance. For example, a content provider may implement or utilize the services of an analysis engine that is configured to analyze metric data. The metric data may come from client devices, and may reflect the performance experienced by the client devices when requesting, receiving, processing, and displaying network resources and individual components thereof. The metric data may also or alternatively come from servers, such as content providers or CDN providers, and may reflect the performance experienced by the servers in hosting content, responding to client requests for content, and otherwise operating in a network content delivery environment. In some embodiments, the analysis engine can determine the performance impact—positive and/or negative—experienced when certain combinations of request-time variables occur during the use of certain content rendering configurations. In this way, the analysis engine can automatically determine the best content rendering configuration to be used in certain circumstances. Thus, rather than relying upon a developer to account ahead of time for the various conditions and corresponding content rendering configurations to be used, the system can automatically detect and implement the best content rendering configuration.

Additional aspects of the present disclosure relate to automatically running tests to determine the impact of different content rendering configurations on performance. Based on the outcomes of the tests (e.g., the effects of the different content rendering configurations on different performance metrics), the system can automatically implement changes to content rendering configurations to optimize or otherwise improve the performance. For example, the analysis engine or content provider can run A/B tests using different content rendering configurations for the same content. A first subset of requests (e.g., 95%) for a particular content item in a given period of time may serve as a control group, and may be processed according to the content rendering configuration that is assigned to the combination of content and request-time environmental variables that are currently being experienced. A second subset of the requests (e.g., 5%) may serve as the test group, and may be processed using a different content rendering configuration. In some embodiments, the test group may be processed using a content rendering configuration that the system has determined may provide a performance improvement. In some embodiments, the test group may be processed using a random or pseudo-random content rendering configuration. In some embodiments, other methods of determining content rendering configurations for the test group may be used. In this way, the system can proactively test one or more different content rendering configurations in a production setting, and potentially determine content rendering configurations that provide improvements over the previously-determined optimal configurations. The improved content rendering configurations can thus be tested by a limited population before being rolled out to the entire user base or otherwise determined to be the current preferred content rendering configuration for a given combination of content and variables.

As one skilled in the art will appreciate in light of this disclosure, certain embodiments may be capable of achieving certain advantages, including some or all of the following: reducing latency as perceived at client devices, reducing network traffic, and reducing server load. Moreover, these advantages may be realized automatically in response to changing network conditions and other operating parameters, while still providing the display of—and interaction with—user interfaces that are customized or otherwise dynamically-generated.

Although aspects of some embodiments described in the disclosure will focus, for the purpose of illustration, on particular examples of content, content components, content rendering configurations, request time variables, performance metrics, and methods of analysis, the examples are illustrative only and are not intended to be limiting. In some embodiments, the techniques described herein may be applied to additional or alternative content, content components, content rendering configurations, request time variables, performance metrics, methods of analysis, and the like. Various aspects of the disclosure will now be described with regard to certain examples and embodiments, which are intended to illustrate but not limit the disclosure.

Network Content Delivery Environment

With reference to an illustrative embodiment, FIG. 1 shows an example network environment in which aspects of the present disclosure may be implemented. In some embodiments, as shown, the network environment may include a content provider system 100 (also referred to as a "content provider" or "content server"), a CDN service provider 102 (also referred to as a CDN), and a client device 104. The content provider 100, CDN 102, and client device 104 may communicate with each other via one or more communication networks 150.

In some embodiments, a communication network 150 (also referred to simply as a "network") may be a publicly-accessible network of linked networks, possibly operated by various distinct parties, such as the Internet. In some cases, the network 150 may be or include a private network, personal area network, local area network, wide area network, global area network, cable network, satellite network, cellular data network, etc., or a combination thereof, some or all of which may or may not have access to and/or from the Internet.

The content provider 100 may be a logical association of one or more computing devices for hosting content, implementing changes to content, and analyzing the performance of content delivery. For example, the content provider 100 can include an origin server component 110 corresponding to one or more server computing devices for obtaining and processing requests for content (such as web pages, embedded resources, and the like) from the CDN, 102, client devices 104, or other systems. The content or portions thereof may be stored in a content data store 112 corresponding to one or more data storage devices. The content provider 100 may also include one or more supporting services 114. Each supporting service 114 may correspond to one or more computing devices configured to provide content—or data from which content may be derived—to the origin server 110. For example, one supporting service 114 may generate recommendations based on user-specific browsing behaviors or other attributes. As another example, a supporting service 114 may generate shipping estimates for products offered for sale via the content provider. The example supporting services are illustrative only and are not intended to be limiting.

The content provider 100 can still further include an analysis engine 116 corresponding to one or more computing devices for obtaining and processing metric data and determining changes to content rendering configurations, as described in greater detail below. In some embodiments, the analysis engine 116 may be separate from the content provider 100 and/or integrated into another system, such as the CDN 102.

The CDN 102 may be a logical association of one or more computing devices for hosting content and servicing requests for the hosted content over the network 150. For example, the CDN 102 may include a web server component 120 corresponding to one or more server computing devices for obtaining and processing requests for content (such as web pages, embedded resources, and the like) from a client device 104. The CDN 102 may also include a content cache component 122 corresponding to one or more data storage devices for storing cached content. In some embodiments, the CDN 102 can include a number of point of presence ("POP") locations that correspond to nodes on the communication network 150. Each CDN POP may include one or more web servers 120 and/or content caches 122. The CDN, CDN POPs, and/or individual components thereof may further include additional software and/or hardware components that facilitate operations including, but not limited to, load balancing or load sharing software/hardware components. Each POP, or a subset thereof, may include a copy of a particular content item hosted by the CDN 102 on behalf of the content provider 100. When a client device 104 requests the content item, the request may be routed to a CDN POP that is closest to the client device 104 and can therefore provide the requested content more quickly than other CDN POPs. In this context, "closest" may refer to the shortest geographic distance between devices, or it may refer to the shortest logical distance, such as the fewest number of network hops required to communicate with the client device 104.

In some embodiments, the features and services provided by the content provider 100 and/or CDN 102 may be implemented as web services consumable via one or more communication networks. In further embodiments, the content provider 100, CDN 102, and/or individual components thereof are provided by one more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

The client device 104 may be any of a wide variety of computing devices, including personal computing devices, terminal computing devices, laptop computing devices, tablet computing devices, electronic reader devices, wearable computing devices, mobile devices (e.g., smart phones, media players, handheld gaming devices, etc.), and various other electronic devices and appliances. A user may operate a user device 104 to request content hosted by the CDN and/or the content provider. For example, a user may launch a browser application 140 or a mobile application (not shown) to request, view, and interact with network content.

Cache-Optimized Page Rendering

With continued reference to the illustrative embodiment shown in FIG. 1, the content provider 100 may host a content item. In order to determine which portion(s) of the content item should be cached at the CDN 102, and which portions should be dynamically rendered by the client device 104 after receiving the cached portion(s), the analysis engine 116 can obtain metric data from various sources and determine a content rendering configuration for the content item.

At [A], the analysis engine 116 may obtain metric data from various data providers, with the consent of the data providers. For example, metric data may be obtained from various client devices 104, the origin server 110, the CDN 102, other devices or systems, or some combination thereof. The metric data may represent the latencies, workload, and/or overall performance of the respective systems during delivery and rendering of the content item. Illustratively, the content item may be a network resource, such as the web page 200 shown in FIG. 2A or the mobile application display 260 shown in FIG. 2B.

Figure 2A:
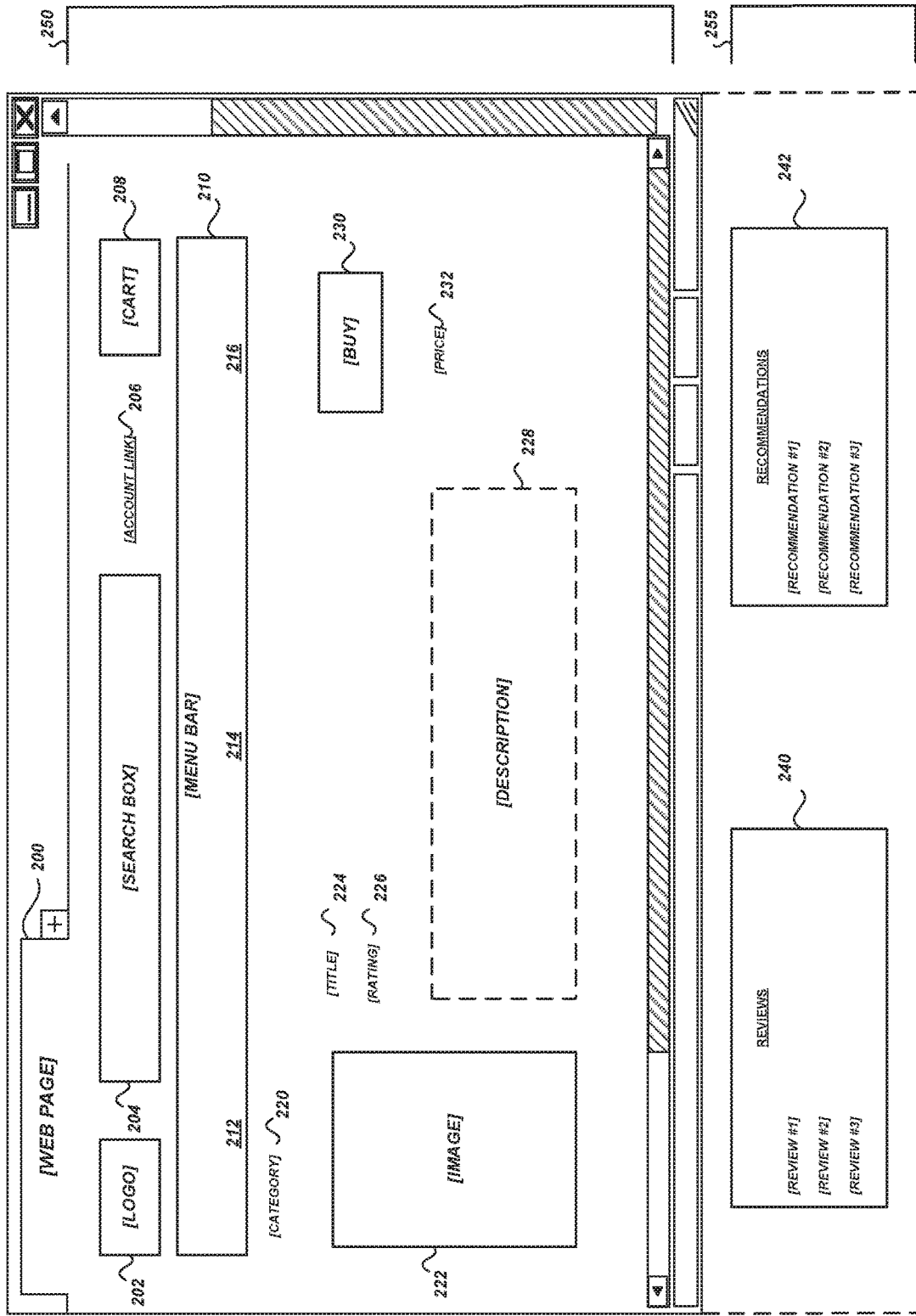
FIGS. 2A and 2B are pictorial diagrams of illustrative network resources displayed in a browser application and a mobile application, respectively, using a content rendering configuration according to some embodiments.
Figure 2B:
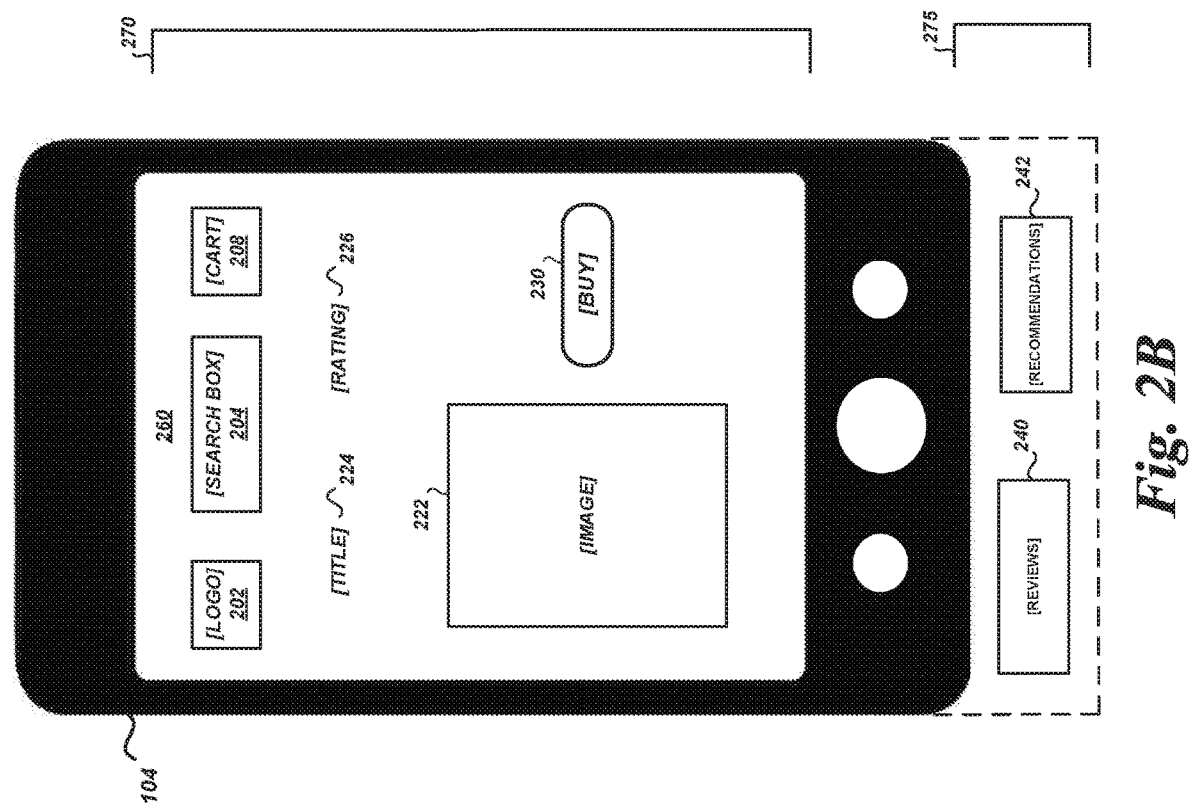

The web page 200 shown in FIG. 2A may be a detail page for a particular item offered via the content provider 100, and may include various components and areas. The top area of the page 200 may include various components for site navigation and information, such as a logo 202, a search box 204, a user account link 206, a cart icon 208, and a menu bar 210 with various menu items 212, 214, 216. The middle area of the page 200 may include various components for providing item details and facilitating interactions, such as a category label 220, an item image 222, a title label 224, a rating indicator 226, a description text area 228, an interactive control such as a buy button 230, and a price label 232. The bottom area of the page 200 may include additional components, such as a review display area 240 and a recommendation display area 242. The components shown in the web page 200 and the areas thereof are illustrative only and are not intended to be limiting. In some embodiments, a web page provided by the content provider may include fewer, additional, and/or alternative components. For example, the middle area of the page 200 may include components for display of delivery estimates and/or product variations (e.g., color, size, configuration), an "add to cart" button that causes a displayed item to be added to a user's shopping cart for later purchase, a "buy now" button that causes a display item to be purchased immediately (e.g., without necessarily being added to the user's cart first), and the like. As another example, the bottom area of the page 200 may include a component for entry and display of questions and answers, a component for displaying and interacting with product comparisons (e.g., a table showing features of a selected product in comparison to other similar products), and the like.

Collectively, the top area and middle area of the page 200 are the areas that are typically within the viewport of the client device 104 when the page 200 is initially displayed. Accordingly, this portion of the page 200 may be referred to as the "above the fold" portion 250 to indicate its status as the first-displayed and first-viewed portion of the page 200. The bottom area of the page 200 may not be viewable when the page 200 is initially displayed by the client device 104. Accordingly, this portion of the page 200 may be referred to as the "below the fold" portion 255 to indicate its status as being initially hidden and requiring an action or event, such as a scrolling interaction, to be viewed.

Each individual component of the page 200 (or some subset thereof) may be either cached at the CDN 102 or dynamically rendered by the client device 104 after the client device 104 receives a top-level resource defining the page 200. For example, the logo 202 may be fairly stable over the course of time and from request to request. Thus, the logo 202 may be a candidate for caching at the CDN 102 so that the logo 202 is obtained from the cache 122 rather than requiring a round-trip request from client device 104 to the origin server 110 and back each time the logo 202 is to be displayed. However, in some instances, caching the logo 202 may not necessarily lead to a desired performance improvement, and therefore the logo 202 may configured to be dynamically rendered by the client device 104. As another example, the user account link 206 may be different for each user that requests the page 200 (e.g., the link text may be the user's name or a unique identifier). Thus, the user account link 206 may not be a candidate for caching because it is different for each user who requests the page 200. However, in some instances, caching such a highly variable component at the CDN 102 may nevertheless result in a desired performance improvement, or at least not cause an undesirable performance hit. Although the components shown in FIG. 2A are all display components, the page 200 may include additional components that have no visible representation that is displayed (e.g., JavaScript files, other executable code, hidden fields, audio files, etc.). These components may be cached and/or dynamically rendered when the page 200 is processed in a manner similar to the display components.

In some embodiments, when a component such as the logo 202 is selected to be cached, the implementation of the caching may involve embedding code for display and control of the component, such as HTML code, in a top-level resource defining the page 200, such as an HTML file. In this way, a client device 104 in receipt of the cached top-level resource may already have the cached component without requiring any additional requests.

In some embodiments, when a component such as the user account link 206 is selected to be dynamically rendered, the implementation of the dynamic rendering may involve embedding, in the top-level resource, executable network-aware rendering code such as JavaScript, AJAX (an acronym for Asynchronous JavaScript and eXtensible Markup Language), or some other application programming interface ("API") call. An API call may also be referred to as an API request. A client device 104 in receipt of the cached top-level resource may then execute the rendering code to obtain any additional content and/or other data over the network 150 and prepare the content for display. In some embodiments, the CDN 102 may cache responses to such API requests. For example, the client device 104 may execute an API call in which a unique user identifier is sent with a request for the user's name so that the name can be displayed in the user account link 206. The CDN 102 may obtain the requested content from the content provider 100 (e.g., from the origin server 110), and provide the content to the client device 104. The CDN 102 may also store the content in the content cache 122. Then, in response to a subsequent request for the same content (e.g., a subsequent API call for the same user's name corresponding to the same user identifier), the CDN 102 can obtain the content from the cache 122 without going to the content provider 104. The responses to API requests may be cached using caching parameters such as time-to-live ("TTL"), similar to the caching parameters used with other forms of content.

In some embodiments, the content provider 100 may proactively provide the CDN 102 with content to be cached, and the CDN 102 may use the content when responding to certain API requests or when sending responding to requests for pages or other top-level network resources. For example, the content provider 100 may provide a database table that includes user identifiers and corresponding user names. In this implementation, the CDN 102 can use the table to respond to the first request for a particular name corresponding to a particular identifier, without retrieving the name from the content provider 100. As another example, the content provider 100 may provide such a database table that the CDN 102 uses to preempt or otherwise provide an alternative to requiring an API call from a client device 104. In this implementation, a client device 104 may include a user identifier in a request for a page 200. The CDN 102 may provide a cached version of the page 200 and, instead of requiring the client device 104 to make a subsequent API call for the user's name, the CDN 102 may preemptively include the user's name in the page 200 before sending the page 200 to the client device 104. Thus, the CDN 102 can respond to a request by accessing different portions of cached content (e.g., the top-level HTML page from one section of the content cache 122, a user's name from a table proactively provided by the content provider 100 and stored in another section of the content cache 122, etc.). The CDN 102 may therefore generate a response that is a composite assembled from different cached data items. Illustratively, the CDN 102 may be dynamically instructed to respond in this way based on the content rendering configuration(s) being used.

Components of the page 200 may also or alternatively be grouped for caching at the CDN 102 and/or for dynamic rendering after page delivery to the client device 104. For example, certain components such as the logo 202, search bar 204, menu bar 210, and menu items 212, 214, 216 may all be substantially stable over time, and may also typically occur together. Thus, these components may be grouped together for purposes of caching. As another example, the item image 222, title 224, and description 228 may all require the same processing to render. In this example, rendering each of the components requires resolving the same unique item identifier in order to determine what content is to be displayed in the components. Thus, these components may be grouped together for purposes of dynamic rendering because a single API request using the unique item identifier is enough to load the appropriate content. In some embodiments, this group of item-specific components may be configured to be cached if, for example, the item is a popular item, the API request using the unique item identifier can be cached, etc. In such cases, the cacheable API request may be embedded into a top-level resource defining the page, and the client device 104 may execute the API request to the CDN 102 instead of the content provider 100.

In some embodiments, a client device 104 may use a mobile application rather than a browser application to access content of the content provider 100. The application display 260 shown in FIG. 2B may correspond to the detail page 200 shown in FIG. 2A and described above. The display 260 may show detail information for a particular item that is similar to or the same as the page 200. For example, the display 260 may have a top area that includes a logo 202, a search box 204, and a cart icon 208. The middle area of the display 260 may include various components for providing item details and facilitating interactions, such as an item image 222, a title label 224, a rating indicator 226, and a buy button 230. The bottom area of the page 200 may include additional components, such as a review display area 240 and a recommendation display area 242. Collectively, the top area and middle area of the display 260 may be the "above the fold" portion 270, and the bottom area of the display 260 may be the "below the fold" portion 275. Some components of the display 260 may be part of or otherwise controlled by the mobile application and may therefore not be received from a server when the display 260 is presented. For example, the mobile application may include the logo 202 and search box 204 and may automatically include these components in the display 260 when the display 260 is presented. Other components may be updated dynamically or otherwise depend on information that is only available at display time. For example, the display 260 may be re-used for multiple different items, and the specific item image 222, title label 224, and rating indicator 226 may be different for individual items.

When the display 260 is to be presented for a particular item, the client device 104 may send a request to the CDN 102 for the necessary information, similar to a request for an HTML detail page 200. In response, the CDN 102 may provide data that the mobile application uses to present the display 260, such as a file or other data structure that includes an image for the item image 222 component (or an address from which the image can be obtained), the title to be displayed in the title label 224, etc. Illustratively, the CDN 102 may provide the data in the form of an eXtensible Markup Language ("XML") file, a JavaScript Object Notation ("JSON") file, or the like. This data may be generated by the origin sever 110 and cached by the CDN 102 in a manner similar to the generation and caching of resources for the page 200 described above. In addition, some of the components of the display 260 may require dynamic rendering, similar to the page 200 described above. For example, the file received from the CDN 102 may include dynamic rendering code (or a reference to dynamic rendering code that is part of the mobile application) to be executed by the client 104 in order to render the review display area 240 and recommendation display area 242. The client device 104 may then execute API requests as needed to complete the rendering of the display 260. The API requests may be fulfilled and cached by the CDN 102 in a manner similar to the API responses and caching for individual components and groups thereof described above.

Returning to FIG. 1, the metric data that is obtained by the analysis engine 116 may reflect various metrics observed at the client device 104, such as performance latencies, cache hit ratios, and cache key attribute entropy and correlation. The metrics may be on a component-by-component basis, group-by-group basis, and/or on a page-level basis. In addition, the analysis engine 116 may obtain metric data from the origin server 110 or other systems involved in delivering requested content (e.g., the CDN 102, supporting services 114, etc.). This metric data may represent certain point-in-time performance parameters (e.g., server load, bandwidth) that reflect the "health" of the corresponding system.

At [B], the analysis engine 116 can analyze the metric data to determine the performance of individual components of the page 200 as obtained and displayed on the client devices 104, and/or to determine the performance of the systems hosting and delivering the page 200. Based on this analysis, the analysis engine 116 or some other system or component may determine a content rendering configuration for the content page 200. An illustrative content rendering configuration is shown in FIG. 3.

FIG. 3 shows a subset of the components of the page 200. Components that require data in order to be rendered are noted with a reference the corresponding data item(s). For example, the category label 220 and recommendation display area 242 are rendered based on the value of the category parameter 310. The item image 222, item title 224, and review display area 240 are rendered based on the value of the item parameter 312. The user account link 208 is rendered based on the value of the user parameter 314. The logo 202 and search box 204 do not require any request-time data and therefore no data item is indicated for those components.

The value that uniquely identifies a given cache item (also referred to as a "cache key") may depend on one or more identifiers, such as the value of the category parameter 310 and/or the item parameter 312. For example, there may be a unique component rendering for each distinct cache key value or subset thereof. In one specific, non-limiting embodiment, the category parameter 310 may take any value represented by a 5-character alphanumeric identifier and may therefore have 36^5 unique values. The item parameter 312 may take any value represented by a 10-character alphanumeric identifier and may therefore have 36^10 unique values. If the cache key for the page 200 (or for a group of components of the page 200, or for a single component of the page 200) is a combination of the category parameter 310 and item parameter 312, there would be 36^15 unique cache keys. This number may be much too large to meaningfully identify individual items (corresponding to individual cache keys) that are to be cached while still satisfying target performance metrics (e.g., cache hit ratio). Therefore, an initial grouping of the components may be based on individual parameters with smaller cache key value spaces (e.g., components depending upon the category parameter 310 may be grouped together, and components depending upon the item parameter 312 may be grouped together in a different group). By grouping together the components that require the same parameter value for rendering, the overall rendering performance may be improved. This result follows when a single API call may be performed to obtain data used to render multiple components, rather than performing the same API call separately for each component.

The analysis engine 116 may detect, however, that the actual distribution of parameter values is much smaller that the example discussed above. Moreover, the number of unique cache keys may not increase exponentially when two or more parameters are combined to form the cache key. For example, there may only be a small fraction of item parameter 312 values that are actually used. In addition, for each item parameter 312 value, there may be one and only one corresponding category parameter 310 value that occurs. In this situation, the analysis engine 116 may determine that there is little or no negative performance impact from determining both the category parameter 310 value and item parameter 312 value. The analysis engine 116 may therefore determine to bundle the components that use the category parameter 310 with the components that use the item parameter 312 into a single group. The group may be identified by a cache key that is the combination of the category parameter 310 value and item parameter 312 value.

FIG. 3 shows a content rendering configuration 302 for the page 200 with component groups determined as discussed above. As shown, the logo 202 and search box 204 have been grouped into group 1, labeled 320. The category label 220, item image 222, item title 224, review display area 240, and recommendation display area 242 have been grouped into group 2, labeled 322. The user account link 208 and various other components have been grouped into group 3, labeled 324, and so on. This content rendering configuration 302 may specify which groups are to be dynamically rendered, and which are to be cached. For example, group 1 may be cached, groups 2 and 3 may be dynamically rendered, etc. The same content rendering or a different content rendering configuration may be used for the application display 260. FIG. 3 shows a content rendering configuration 306 for the application display 260 that differs in some respects from the content rendering configuration 302. For example, the logo 202 and search box 204 may be maintained by and displayed by the mobile application, and therefore no content from the CDN 102 or content provider 100 is required in order to display these components. Therefore, these components may be excluded from the content rendering configuration 306. As another example, the item image 222 and title label 224 have been grouped into group 1, labeled 362, separately from the review display area 240 and recommendation area 242, which have been grouped into group 2, labeled 364. This separate grouping may have been implemented to minimize latency for the above the fold section 270 of the application display 260 (e.g., so that rendering of components in the above the fold section 270 is not held up while obtaining data to render components in the below the fold section 275). As a further example, the cart icon 208 may or may not be included in a particular group 366, or may not be included in the content rendering configuration 306 at all, depending on how the mobile application maintains information about a user session from screen to screen.

Returning to FIG. 1, at [C] the content provider 100 can provide content and content rendering configurations to the CDN 102. For example, the content provider 100 can generate a version of the page 200 that includes cached components and groups, and that includes rendering code for dynamic rending of non-cached components and groups. The content provider 100 may provide the content to the CDN 102 in response to a request from the CDN 102, such as a request made after expiration of a time to live ("TTL") caching parameter assigned to a prior version of content, an If-Modified-Since Hypertext Transfer Protocol ("HTTP") request, etc. In some embodiments, the content provider 100 may proactively provide the content to the CDN 102 (e.g., without first receiving a request).

At [D], the CDN 102 can process requests for the content and maintain the cache 122. For example, the CDN 102 may receive a request from the client device 104 at [E], obtain the requested content from the cache 122 if available, and send the cached content to the client device 104. If the requested content is not in the cache 122 or if the TTL for the content has expired, the CDN 102 can obtain a fresh version of the content from the content provider 100. The content rendering configuration can specify which parameters may or may not be provided to the content provider 100 when the CDN 102 requests content. For example, the content rendering configuration may indicate that some parameters (e.g., a unique session ID assigned to the current browse session for this client device) are not to be passed to the content provider 100 when requesting content, because doing so would create a specific cache key that would adversely affect the cache hit ratio for the content being requested. In this example, the content provider 100 can provide a default version of any components that may otherwise be dynamically determined based on the excluded parameters. In some embodiments, the content provider 100 may include dynamic rendering code that is to be executed by the client browser to replace the default version with the dynamically-determined version of the component after the client device receives the content from the CDN 102. As another example, the content rendering configuration may indicate that some parameters (e.g., the item ID and category ID for the item that is to be the subject of a requested detail page) are to be passed to the content provider 100 when requested content, because doing so will allow the CDN 102 to cache portions of the item detail page that are likely to be requested by other client devices.

At [F], the client device 104 can process the content received from the CDN 102. Processing the content may involve parsing and displaying content included in a top-level resource (e.g., HTML file), executing rendering code (e.g., API requests) embedded in the top-level resource for non-cached components, and the like. The client device 104 can record metrics regarding the content request, retrieval and rendering, and provide the metrics to the content provider 100. From this point, the data flows and interactions shown in FIG. 1 and described above may be repeated as necessary.

Content Rendering Configuration Testing and Adjustment

Figure 4:
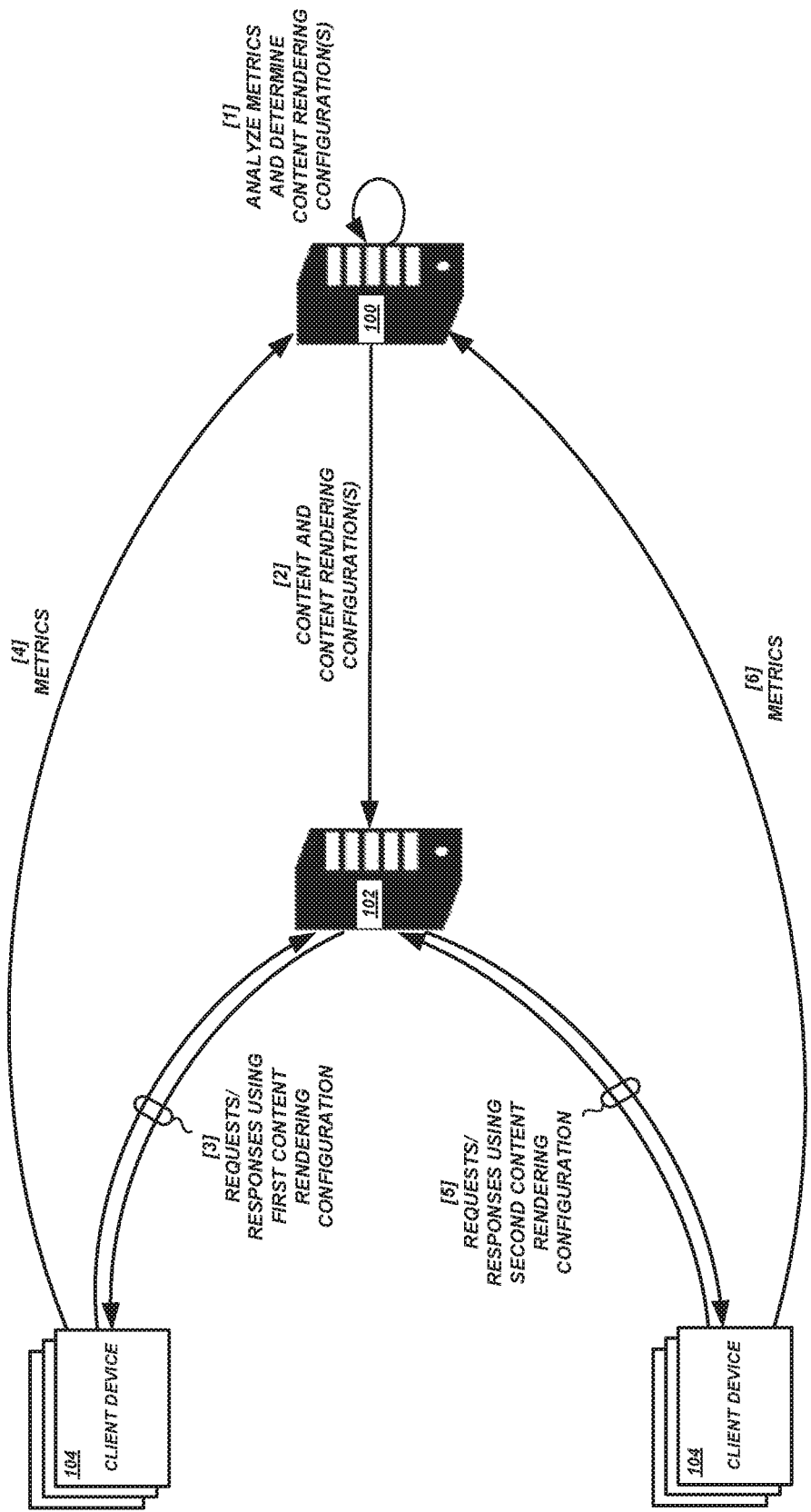
FIG. 4 is a block diagram of illustrative data flows and interactions between a content provider, CDN provider, and various client devices during cached content delivery and rendering according to some embodiments.

FIG. 4 shows data flows and interactions between a content provider 100, CDN 102, and various user devices 104 during the testing of a content rendering configuration. In some embodiments, the data flows and interactions shown in FIG. 4 may occur after those shown in FIG. 1. For example, the content provider 100 may have metric data regarding the page requests, responses, and renderings shown in FIG. 1.

At [1], the analysis engine 112 or some other system may determine, based on an analysis of the metric data, to modify a content rendering configuration for a page (or generate a new content rendering configuration). For example, the page 200 shown in FIG. 2 may currently be assigned the first content rendering configuration 302 shown in FIG. 3. The analysis engine 116 may determine that a different content rendering configuration may provide better performance. More specifically, the review display area 240 has been grouped with the category label 220, item image 222, and item title 224. However, the review display area 240 is below the fold, whereas the category label 220, item image 222, and item title 224 are all above the fold. In addition, rendering the review display area 240 may involve retrieving a substantial amount of data, which may slow down overall display of the above the fold portion 250 for processing of an element that is the below the fold portion 255. A similar determination may be made regarding the recommendation display area 242, which is also in the same group, is below the fold, and requires obtaining a substantial amount of data. In this case, the analysis engine 116 may determine to move the review display area 240 and recommendation display area 242 into a separate group that will have less of a performance impact on the above the fold components.

The analysis engine 116 or some other system may generate a second content rendering configuration 304 based on the foregoing analysis. The second content rendering configuration 304 may specify that the label 220, item image 222, and item title 224 are to be grouped into group 2, labeled 342. The review display area 240 and recommendation display area 242 may be grouped into a separate group, group 3, labeled 344. Other components may maintain the same grouping or be placed in different groupings as needed. Illustratively, the logo 202 and search box 204 may be grouped into group 1, labeled 340. The user account link 208 and various other components may be grouped into group 4, labeled 346.

At [2], the content provider 100 may provide to the CDN 102 the page 200 and second content rendering configuration to be tested. Illustratively, the version of the page 200 that is provided at [2] may be a HTML file that includes markup language code for the cached components specified by the second content rendering configuration 304, such as the logo 202 and search box 204. The HTML file may also include dynamic rendering code for the dynamically rendered components specified by the second content rendering configuration 304. More specifically, the dynamic rendering code may include a first API request for group 342, a second API request for group 344, a third API request for group 346, etc.

At [3], a first group of requests associated with the first content rendering configuration 302 may be handled as part of a control group 402. These content requests may be processed using the first content rendering configuration 302 as described above. The client devices 104 that have processed control group 402 requests may provide metric data to the content provider 100 at [4].

At [5], a second group of requests associated with the second content rendering configuration 304 may be handled as part of a test group 404. These content requests may be processed using the second content rendering configuration 304 in a different manner than the first content rendering configuration, as described above. The client devices 104 that have processed test group 404 requests may provide metric data to the content provider 100 at [6].

Figure 5:
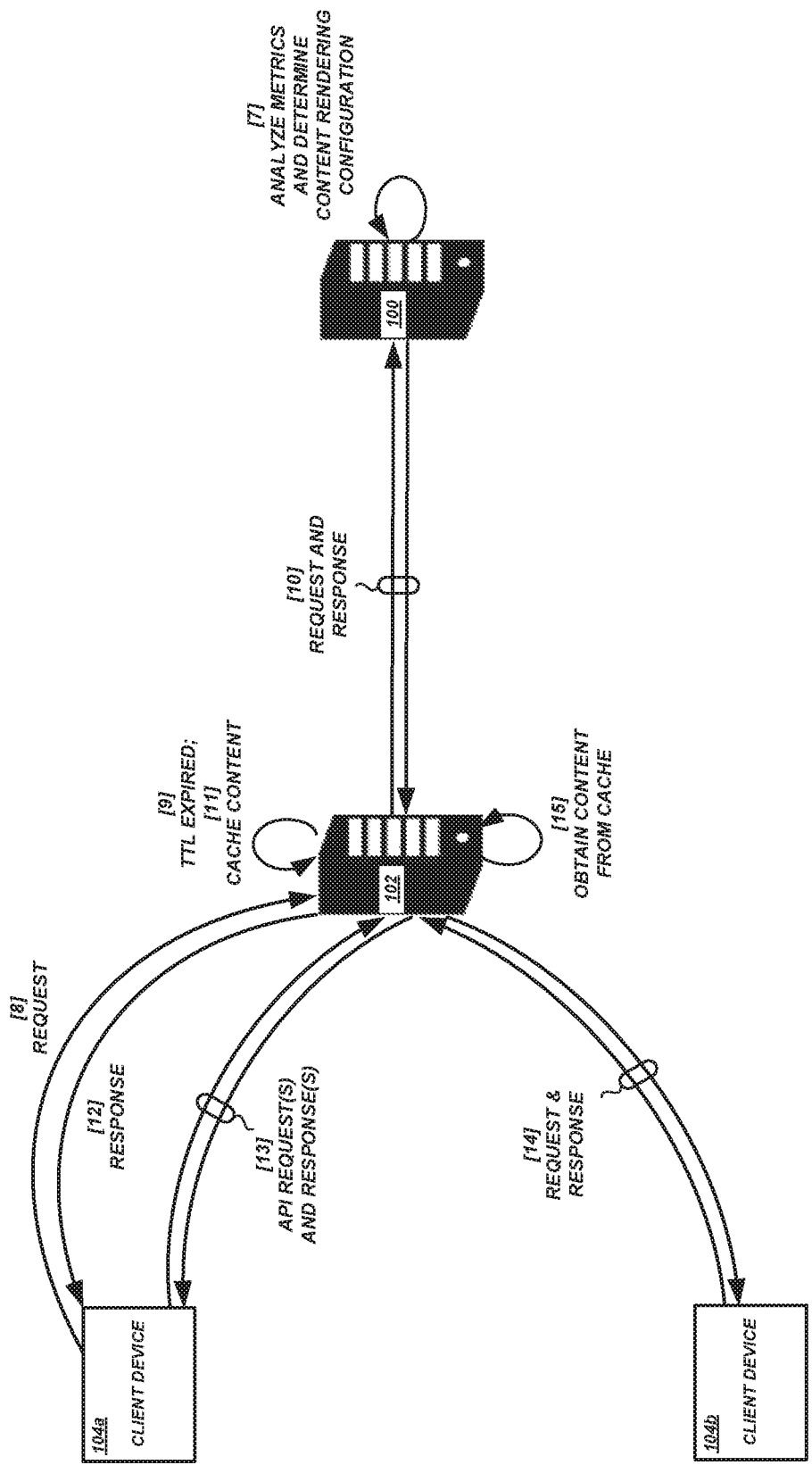
FIG. 5 is a block diagram of additional illustrative data flows and interactions between a content provider, CDN provider, and various client devices during cached content delivery and rendering according to some embodiments.

Turning to FIG. 5, at [7] the analysis engine 112 may analyze the metric data regarding the control group 402 requests and test group 404 requests. The analysis engine 112 may determine, based on an analysis of the metric data, that use of the second content rendering configuration 304 for this page under the currently observed parameters provides an improvement to a performance metric, when compared to the use of the first content rendering configuration 302. The analysis engine 112 may therefore assign the second content rendering configuration 304 for use in this scenario.

At [8], a client device 104*a* may request the content page from the CDN 102. At [9], the CDN 102 may determine that the TTL for the content page has expired (or that some other cache refresh criterion has been satisfied).

At [10], the CDN 102 may retrieve the content page from the content provider 100. The request to the content provider 100 may be made in accordance with the newly-selected second content rendering configuration 304. For example, once the analysis engine 112 determined that the second rendering configuration is the configuration to be used, the analysis engine 112 may have instructed the CDN 102 accordingly. Thus, the CDN 102 can obtain a fresh version of the page using the second content rendering configuration rather than the older, no-longer-used first content rendering configuration. In this way, the CDN 102 can ensure that the proper parameters are passed to the content provider 100 for the page, and that the parameters designated for exclusion are not passed to the content provider 100.

At [11] the CDN 102 can cache the fresh version of the page. The CDN 102 can provide the fresh version to the client device 104*a* at [12]. The client device 104*a* can render the page and made any necessary dynamic rendering calls at [13] to complete the rendering of the page.

At [14], a second client device 104*b* may request the same page from the CDN 102. The CDN 102 may determine at [15] that the TTL for the page has not yet expired and may provide the page to the client device 104*b*.

In some embodiments, the content rendering configuration (or a portion thereof) may not be provided to the CDN 102. Rather, the content provider 100 may use the content rendering configuration to determine how to respond to content requests. For example, the content provider 100 may use the content rendering configuration to determine that cached non-customized content is to be provided to a CDN 102 or client device 104 even though the request from the client device 102 may include data needed to render customized content (e.g., item ID, user ID, etc.). In this implementation, the content provider 100 can choose to discard or ignore the customization data, and instead provide a content item that includes dynamic rendering code to be executed by the client device 104.

In some embodiments, the content rendering configuration (or a portion thereof) may be provided to the client device 104. For example, the client device 104 may receive a content rendering configuration associated with a particular content item (e.g., the page 200). By processing the content rendering configuration, the client device 104 may determine which API calls are to be made, and the client device 104 can make the API calls in parallel with each other, in parallel with processing of the top-level resource received from the CDN 102 or content provider 100, etc.

Metric Analysis and Configuration Determination Process

Figure 6:
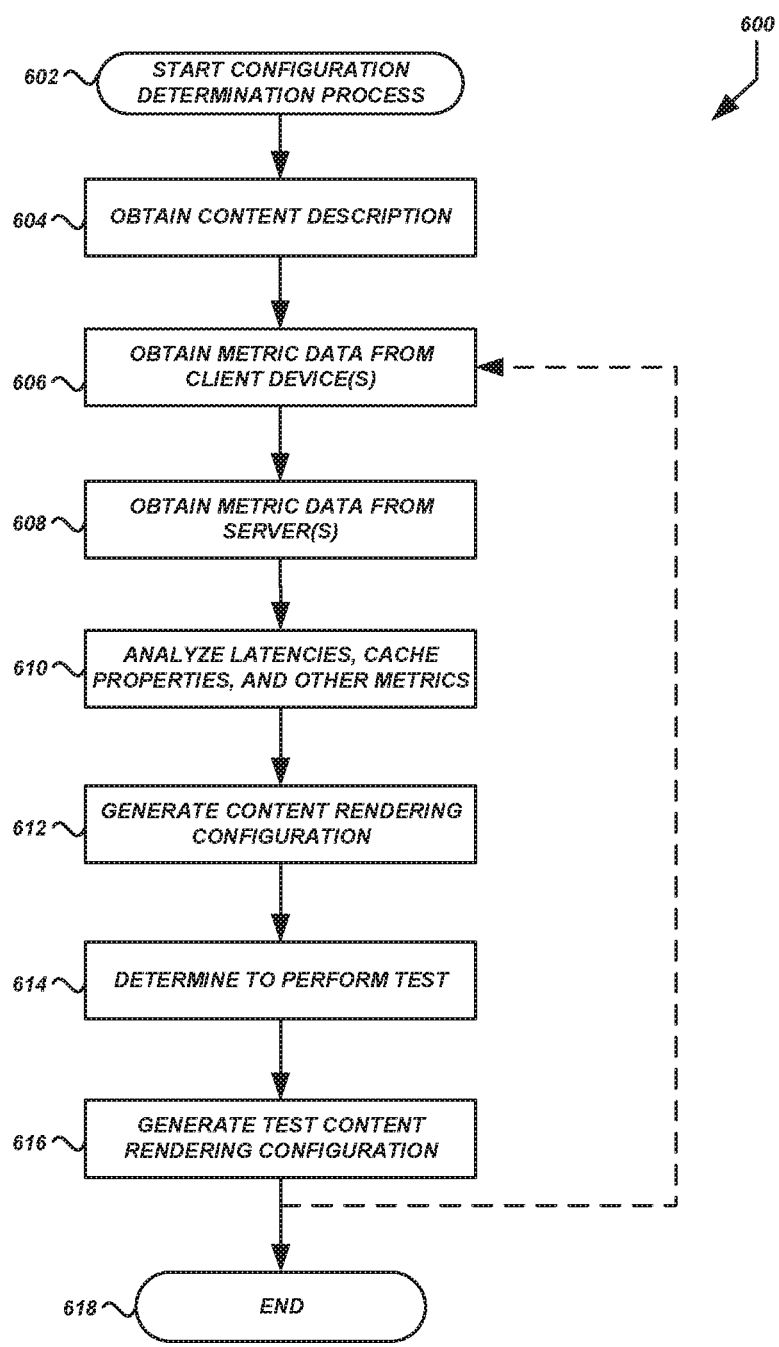
FIG. 6 is a flow diagram of an illustrative process for determining content rendering configurations according to some embodiments.

FIG. 6 is a flow diagram of an illustrative process 600 that may be executed by an analysis engine 112 to analyze metric data regarding the performance of content rendering configurations, generate tests for new content rendering configurations, and select a content rendering configuration to be used for a particular combination of content and operating parameters. The process 600 begins at block 602. The process 600 may begin in response to an event, such as when the analysis engine 112 begins execution, receives metric data, or is instructed to begin processing (e.g., on a predetermined or dynamically determined schedule, on demand by an administrator, etc.). When the process 600 is initiated, a set of executable program instructions stored on one or more non-transitory computer-readable media (e.g., hard drive, flash memory, removable media, etc.) may be loaded into memory (e.g., random access memory or "RAM") of computing device. For example, analysis engine instructions 716 shown in FIG. 7 may be loaded into memory 708 of the computing device 100 and executed by one or more processors 702. In some embodiments, the process 600 or portions thereof may be implemented on multiple processors, serially or in parallel.

At block 604, the analysis engine 112 or some other system can obtain content data representing a content item or other network resource to be analyzed. Illustratively, the content data may be the content item itself (e.g., an HTML file), or a structural definition of the content item (e.g., a design schema listing the various display components and other components of the content, the data required to render the components, etc.).

At block 606, the analysis engine 112 or some other system can obtain metric data representing various performance metrics observed by client devices during the process of requesting, receiving, rendering, and displaying the content. Illustratively, metric data from a particular client device may include measurements related to the content, such as the amount of time taken to initially load the content, the amount of time elapsed before all above the fold content is displayed, the overall perceived latency, and a listing of all dynamic rendering operations performed (e.g., all API calls, their corresponding parameters, etc.). In addition, for each dynamically rendered component, the client metric data may indicate whether there was a cache hit or miss for the API call, the latency experienced in connection with the call, etc. Client metric data may also represent client device-specific operating parameters, such as current bandwidth, processing load, and the like.

At block 608, the analysis engine 112 or some other system can obtain metric data representing various performance metrics observed by server systems when responding to content requests. Illustratively, the server metric data may be obtained from one or more different server systems, such as the CDN 102, origin server 110, and/or various supporting services 114. The server metric data may include measurements related to the content, such as total amount of time to respond to a request, whether there was a cache hit or miss, etc. The server system metric data may also represent server-specific operating parameters, such as current bandwidth, processing load, and the like.

At block 610, the analysis engine 112 or some other system can analyze the metric data for the content and/or individual components thereof. In some embodiments, the analysis engine 112 may use a machine learning model to analyze the metric data, such as a neural network, conditional random field, or the like. In some embodiments, the analysis engine 112 may use a statistical model to analyze the metric data. In some embodiments, the analysis engine 112 may use other methods to analyze the data.

Illustratively, the output of the analysis process may be a score, likelihood, rating, or other value for individual components of a content item. Individual values may indicate whether the corresponding component is best handled as a cached component, dynamically rendered component, grouped with other components, etc. The analysis engine 112 may generate output by optimizing for a particular performance metric, such as overall perceived latency at the average client device 104 or a client device 104 with specific characteristics, overall server load at the CDN 102, origin server 110, and/or supporting services 114, and the like. In this way, the analysis engine 112 can select or generate the content rendering configuration that produces the optimal or best observed value for a desired performance metric.

At block 612, the analysis engine 112 or some other system can generate a content rendering configuration based on the analysis performed above. The content rendering configuration may be implemented by providing configuration data representing the content rendering configuration to other systems, such as the CDN 102, origin server 110, etc.

At block 614, the analysis engine 112 or some other system can determine to run one or more tests with different content rendering configurations in order to obtain additional metric data from which to make an empirical determination of the best (or otherwise desired) content rendering configuration.

At block 616, the analysis engine 112 or some other system can generate one or more test content rendering configurations to be use during the test determined above. A test content rendering configuration can differ from a currently-implemented content rendering configuration for a particular network resource in a variety of ways. For example, the test content rendering configuration may identify a particular component of the network resource as a cached component, while the current content rendering configuration identifies the same component as a dynamically rendered component. As another example, the test content rendering configuration may identify a particular component of the network resource as a dynamically rendered component, while the current content rendering configuration identifies the same component as a cached component. As yet another example, the test content rendering configuration may identify a subset of components as a group to be processed using a single API call, while the current content rendering configuration specifies the same components are to be handled separately, grouped in different groups, etc. As a further example, the test content rendering configuration may specify that certain components are to be handled separately, while the current content rendering configuration specifies the same components are to be grouped together. These example test content rendering configuration features are illustrative only and are not intended to be liming.

At block 618, the analysis engine 112 or some other system can implement the test content rendering configuration(s) determined above. The process 600 may return to block 606 for further analysis. In some embodiments, the process 600 may terminate at block 620.

Example Content Provider Computing System

Figure 7:
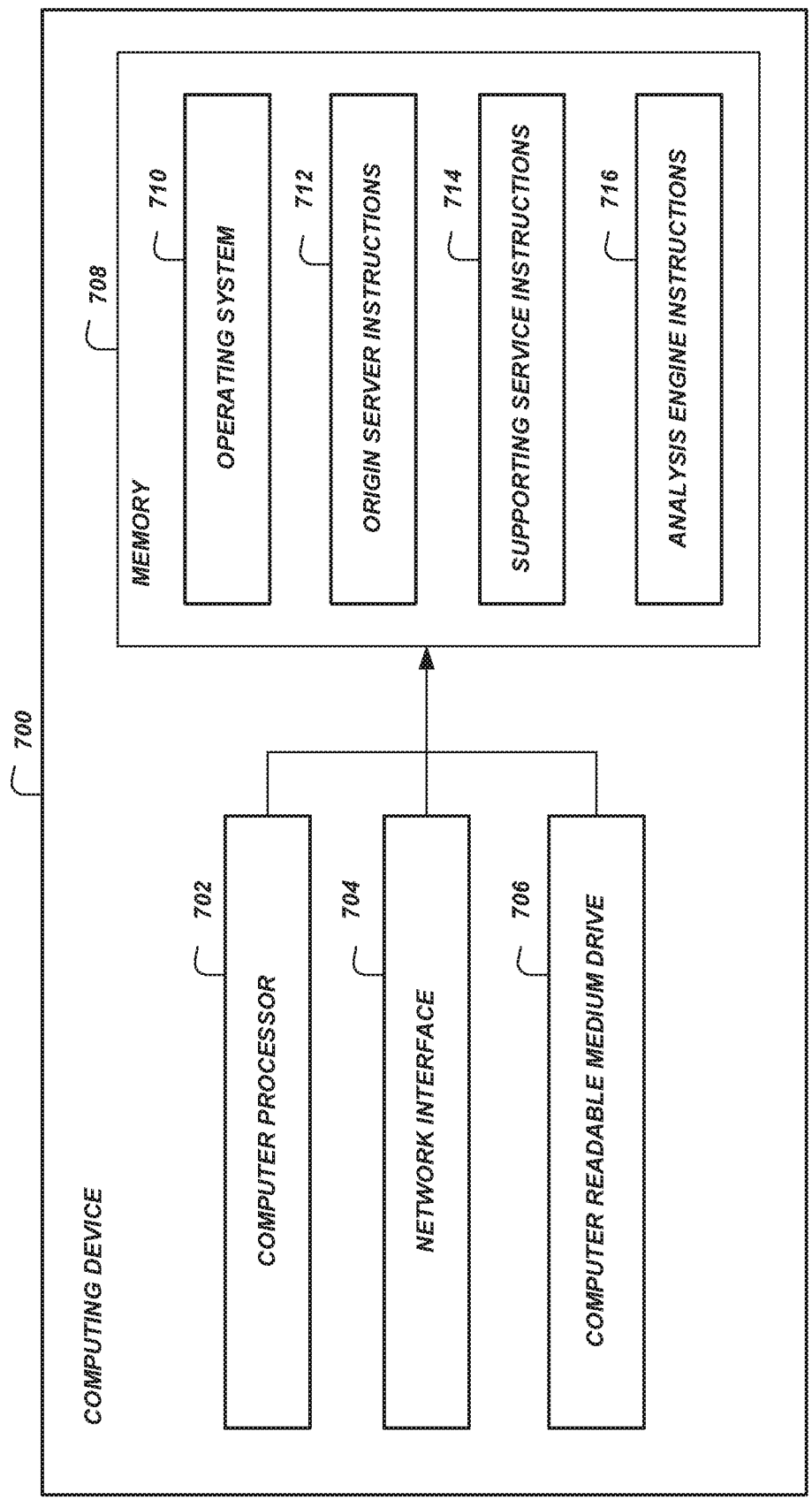
FIG. 7 is a block diagram of various components of a content provider computing device according to some embodiments.

FIG. 7 shows components of an illustrative content provider 100 computing device 700. In some embodiments, as shown, the computing device 700 may include: one or more computer processors 702, such as physical central processing units ("CPUs"); one or more network interfaces 704, such as a network interface cards ("NICs"); one or more computer readable medium drives 706, such as a high density disk ("HDDs"), solid state drives ("SDDs"), flash drives, and/or other persistent non-transitory computer-readable media; and one or more computer readable memories 708, such as random access memory ("RAM") and/or other volatile non-transitory computer-readable media. The computer readable memory 708 may include computer program instructions that the computer processor 702 executes in order to implement one or more embodiments. For example, the computer readable memory 708 can store an operating system 710 that provides computer program instructions for use by the computer processor 702 in the general administration and operation of the content provider 100. The computer readable memory 708 may also include origin server instructions 712 for implementing the origin server 110. The computer readable memory 708 may also include supporting service instructions 714 for implementing various supporting services 114. The computer readable memory 708 may also include analysis engine instructions 716 for implementing the analysis engine 116. In some embodiments, the configuration management system 104 may also include or be in communication with various data stores, such as a content data store 112.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a computer processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A computer processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for managing caching of dynamic web pages, the system comprising:
   a content cache storing a web page associated with an assigned content rendering configuration,
      wherein the assigned content rendering configuration comprises a first content rendering configuration that identifies at least a first component of the web page as a cached component and at least a second component of the web page as a dynamically rendered component,
      wherein the web page comprises markup language code to display the cached component, and
      wherein the web page further comprises executable code to cause a client browser to perform an application programming interface call to render the dynamically rendered component; and
   a computing device comprising one or more processors configured by executable instructions to at least:
      receive first metric data representing one or more performance metrics associated with display of the web page on one or more client devices, wherein the web page is provided to the one or more client devices based on the first content rendering configuration;
      determine, using the first metric data, to generate a second content rendering configuration different than the first content rendering configuration,
         wherein a first portion of responses to requests for the web page are to be generated using the first content rendering configuration, and
         wherein a second portion of responses to requests for the web page are to be generated using the second content rendering configuration;
      receive second metric data representing one or more performance metrics associated with display of the web page provided based on the second content rendering configuration; and determine, using the second metric data, to change the assigned content rendering configuration from the first content rendering configuration to the second content rendering configuration.

2. The system of claim 1, wherein the second content rendering configuration being different than the first content rendering configuration comprises the second content rendering configuration identifying one of: the first component as a dynamically rendered component, or the second component as a cached component.

3. The system of claim 1, wherein the second content rendering configuration being different than the first content rendering configuration comprises the second content rendering configuration specifying the second component and a third component are to be processed as a group of dynamically rendered components based on a single application programming interface call.

4. The system of claim 1, wherein the content cache is configured to obtain a new version of the web page, and content rendering configuration currently associated with the web page, in response to determining that a time to live associated with the web page has expired.

5. A computer-implemented method comprising:
under control of a computing system comprising one or more computer processors configured to execute specific instructions,
obtaining, from a client device, metric data associated with a network resource provided to the client device based on an assigned content rendering configuration,
wherein the metric data represents one or more performance metrics associated with processing of the network resource by the client device,
wherein the network resource comprises a plurality of components, and
wherein the assigned content rendering configuration comprises a first content rendering configuration that identifies at least a first component of the plurality of components as a cached component, and a second component of the plurality of components as a dynamically rendered component;
determining, using the metric data, that providing the network resource based on a second content rendering configuration, different than the first content rendering configuration, is associated with an improvement to a performance metric;
determining to change the assigned content rendering configuration from the first content rendering configuration to the second content rendering configuration, wherein the second content rendering configuration identifies at least the second component as a cached component;
generating configuration data representing the second content rendering configuration as the assigned content rendering configuration; and
sending the configuration data to a computing device.

6. The computer-implemented method of claim 5, wherein generating the configuration data comprises generating data identifying the first component as a dynamically rendered component.

7. The computer-implemented method of claim 6, wherein providing the network resource based on the second content rendering configuration comprises providing a version of the network resource with executable code that causes a client browser to make an application programming interface call to render the first component.

8. The computer-implemented method of claim 5, wherein generating the configuration data comprises generating data identifying the second component as a cached component.

9. The computer-implemented method of claim 5, wherein sending the configuration data to the computing device comprises sending the configuration data to at least one of: the client device, an origin content server associated with the network resource, or a content delivery network server associated with the network resource.

10. The computer-implemented method of claim 5, further comprising receiving, from a server device, second metric data representing one or more performance metrics associated with delivery of the network resource, wherein determining that providing the network resource based on the second content rendering configuration is associated with an improvement to the performance metric is further performed using the second metric data.

11. The computer-implemented method of claim 5, wherein determining that providing the network resource based on the second content rendering configuration is associated with an improvement to the performance metric comprises analyzing at least a portion of the metric data associated with processing individual dynamically rendered components of the plurality of components, and wherein the portion of the metric data relates to at least one of a latency measurement or a cache hit ratio.

12. The computer-implemented method of claim 5, further comprising:
identifying a first subset of the plurality of components that are to be rendered based at least partly a first parameter value, wherein the first parameter value is to be determined in response to a request for the network resource;
identifying a second subset of the plurality of components that are to be rendered based at least partly on a second parameter value, wherein the second parameter value is to be determined in response to the request for the network resource; and
analyzing at least a portion of the metric data associated with individual components of the first subset of the plurality of components or the second subset of the plurality of components.

13. The computer-implemented method of claim 12, further comprising:
determining, based at least partly on analyzing the portion of the metric data, to group the first subset of the plurality of components with the second subset of the plurality of components,
wherein generating the configuration data comprises generating data specifying that the first subset of the plurality of components and the second subset of the plurality of components are to be processed by a client browser as a group of dynamically processed components.

14. The computer-implemented method of claim 12, further comprising:
determining, based at least partly on analyzing the portion of the metric data, that the first subset of the plurality of components are to be processed separately from the second subset of the plurality of components,
wherein generating the configuration data comprises generating data specifying that the first subset of the plurality of components are to be processed by a client browser as a first group of dynamically processed components, and the second subset of the plurality of components are to be processed by the client browser as a second group of dynamically processed components.

15. The computer-implemented method of claim 5, further comprising:
generating test configuration data representing a test content rendering configuration, wherein a first portion of responses to requests for the network resource are to be generated using the test content rendering configuration, and wherein a second portion of responses to requests for the network resource are to be generated using the second content rendering configuration;
receiving second metric data associated with using the second content rendering configuration;
receiving third metric data associated with using the test content rendering configuration; and
selecting the test content rendering configuration based at least partly on an analysis of the second metric data and the third metric data.

16. The computer-implemented method of claim 15, wherein generating the test configuration data comprises determining that a component is to be a cached component, wherein the second content rendering configuration specifies that the component is to be a dynamically rendered component.

17. The computer-implemented method of claim 15, wherein generating the test configuration data comprises determining that a first component and a second component are to be grouped together, wherein the second content rendering configuration specifies that the first component is to be processed separately from the second component.

18. A system comprising:
computer-readable memory storing executable instructions; and
one or more processors in communication with the computer-readable memory and configured by the executable instructions to at least:
obtain metric data associated with a network resource provided to a client device based on an assigned content rendering configuration, wherein the metric data represents one or more performance metrics associated with processing of the network resource by the client device, and wherein the assigned content rendering configuration comprises a first content rendering configuration that identifies at least a first component of the network resource as a cached component, and a second component of the network resource as a dynamically rendered component;
determine, using the metric data, that providing the network resource based on a second content rendering configuration, different than the first content rendering configuration, is associated with an improvement to a performance metric;
determine to change the assigned content rendering configuration from the first content rendering configuration to the second content rendering configuration, wherein the second content rendering configuration identifies at least the first component as a dynamically rendered component; and
generate configuration data representing the second content rendering configuration.

19. The system of claim 18, wherein executable instructions to determine that providing the network resource based on the second content rendering configuration is associated with the improvement to the performance metric comprise executable instructions to analyze metric data relating to at least one of a latency measurement or a cache hit ratio.

20. The system of claim 18, wherein the one or more processors are further configured by the executable instructions to at least:
generate test configuration data representing a test content rendering configuration, wherein a first portion of responses to requests for the network resource are to be generated using the test content rendering configuration, and wherein a second portion of responses to requests for the network resource are to be generated using the second content rendering configuration; and
select the second content rendering configuration based at least partly on an analysis of second metric data associated with using the second content rendering configuration and third metric data associated with using the test content rendering configuration.

* * * * *